United States Patent
Zhao

(10) Patent No.: US 10,834,740 B2
(45) Date of Patent: Nov. 10, 2020

(54) CHANNEL RESOURCE SCHEDULING METHOD AND APPARATUS

(71) Applicant: HUAWEI TECHNOLOGIES CO., LTD., Guangdong (CN)

(72) Inventor: Mu Zhao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 224 days.

(21) Appl. No.: 16/015,311

(22) Filed: Jun. 22, 2018

(65) Prior Publication Data

US 2018/0302910 A1    Oct. 18, 2018

Related U.S. Application Data

(63) Continuation of application No. PCT/CN2016/106715, filed on Nov. 22, 2016.

(30) Foreign Application Priority Data

Dec. 24, 2015   (CN) .......................... 2015 1 0982350

(51) Int. Cl.
*H04W 72/12* (2009.01)
*H04W 24/10* (2009.01)
(Continued)

(52) U.S. Cl.
CPC ...... *H04W 72/1231* (2013.01); *H04B 7/0408* (2013.01); *H04B 7/0695* (2013.01);
(Continued)

(58) Field of Classification Search
CPC ............. H04W 72/1231; H04W 24/10; H04W 72/0446; H04W 84/12; H04B 7/0408; H04B 7/0695; H04B 7/0697; H04B 7/088
See application file for complete search history.

(56) References Cited

U.S. PATENT DOCUMENTS 9,178,593 B1    11/2015  Liu et al.
2015/0365156 A1  12/2015  Huang
(Continued)

FOREIGN PATENT DOCUMENTS

CN    103199906 A    7/2013
CN    103891336 A    6/2014
CN    105144814 A    12/2015

OTHER PUBLICATIONS

Yan Zhang,"Research on Virtual Relay Based Interface Mitigation and Spatial Reuse Scheme in60GHz Communication Network",dated 2013,total 1 pages.

*Primary Examiner* — Luat Phung
(74) *Attorney, Agent, or Firm* — Womble Bond Dickinson (US) LLP

(57) ABSTRACT

In at least some embodiments, a channel resource scheduling method includes sending a management frame that includes directional channel quality measurement information. The directional channel quality measurement information includes identifiers of at least two candidate station pairs selected by the access point to perform channel quality measurement and a channel resource that is used for directional channel quality measurement and that is allocated to each candidate station pair in the at least two candidate station pairs. A directional channel quality measurement report returned by each candidate station in the at least two candidate station pairs is received. At least two target station pairs to perform spatial sharing are selected based on the directional channel quality measurement report of each candidate station. In at least some embodiments, the directional channel quality measurement information can be carried in the management frame to save the channel resource and improve system efficiency.

15 Claims, 10 Drawing Sheets

(51) Int. Cl.
*H04B 7/06* (2006.01)
*H04B 7/08* (2006.01)
*H04B 7/0408* (2017.01)
*H04W 84/12* (2009.01)
*H04W 72/04* (2009.01)

(52) U.S. Cl.
CPC .......... *H04B 7/0697* (2013.01); *H04B 7/088* (2013.01); *H04W 24/10* (2013.01); *H04W 72/0446* (2013.01); *H04W 84/12* (2013.01)

(56) References Cited

U.S. PATENT DOCUMENTS

2016/0316375 A1 10/2016 Li
2016/0316484 A1 10/2016 Feng et al.
2019/0053088 A1* 2/2019 Jo ..................... H04W 24/10

* cited by examiner

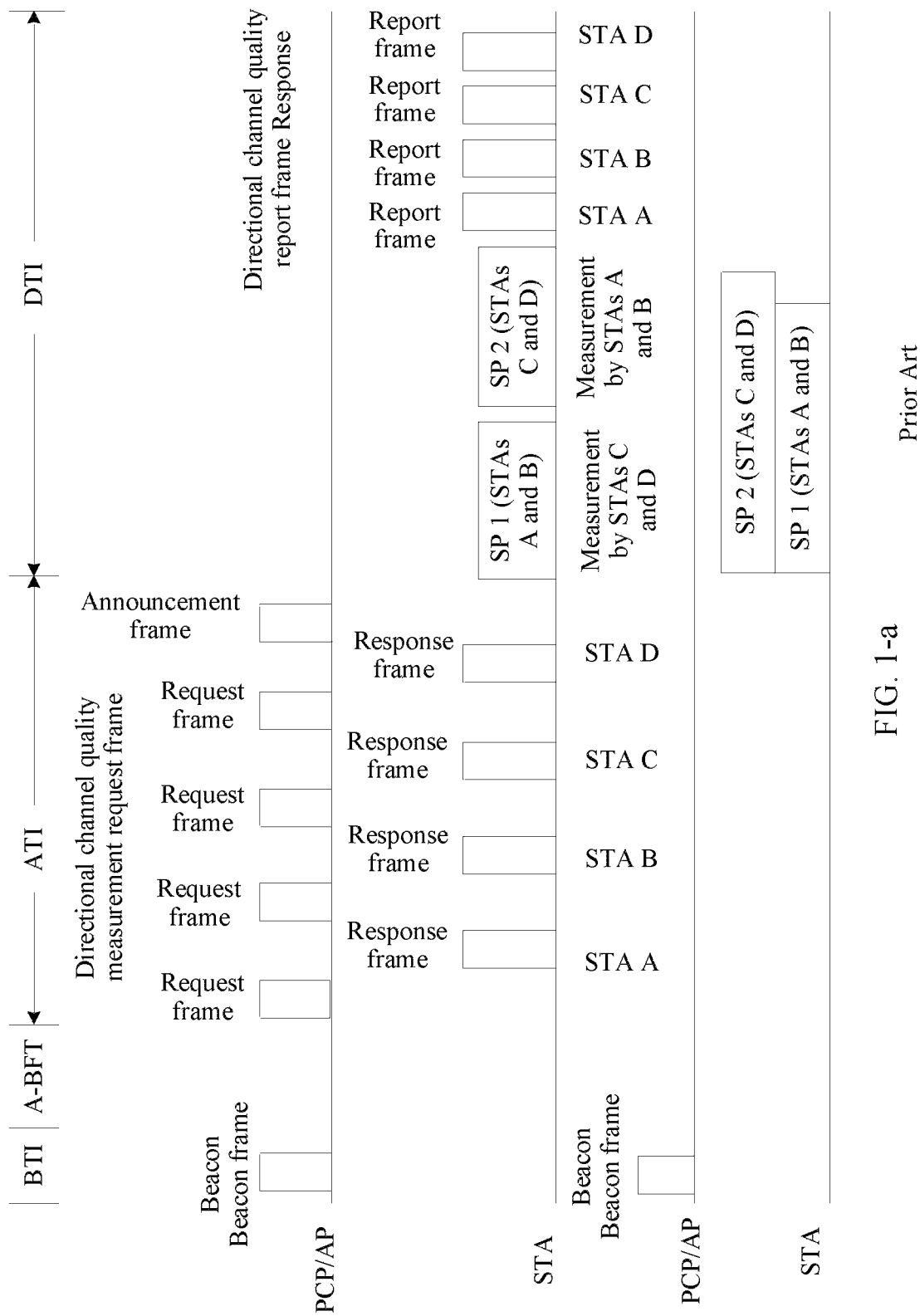
FIG. 1-a
Prior Art

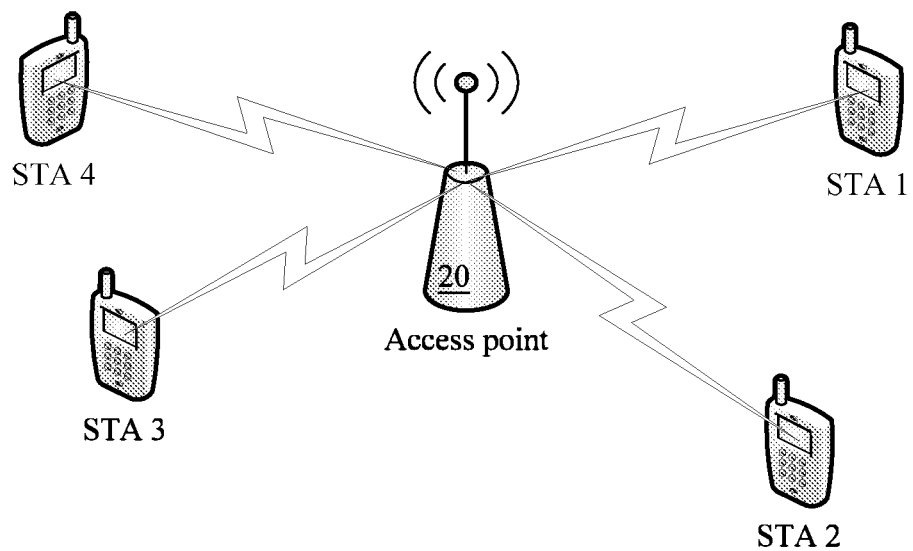
FIG. 1-b

| | |
|---|---|
| Reserved byte<br>Reserved | 1 |
| Optional subunits<br>Optional subelements | 1 |
| Measurement unit time<br>Number of Time Blocks | 1 |
| SP Measurement duration<br>Measurement Duration | 2 |
| SP Measurement start time<br>Measurement Start Time | 4 |
| STA C identifier<br>AID 2 | 1 |
| STA A identifier<br>AID 1 | 1 |
| Operating channel<br>Channel Number | 1 |
| STA operating standard<br>Operating Class | 1 |
| Allocation control field<br>Allocation Control | 2 |
| | Octets: |

FIG. 4

| SP allocation control field Allocation ID | Allocation type Allocation Type | Measurement type Measurement Method | Is PCP active? PCP Active | Is a low power single carrier PHY used? LP SC Used | Reserved field Reserved |
|---|---|---|---|---|---|
| 4 | 3 | 1 | 1 | 1 | 6 |

Bits:

FIG. 5

| Bit 4 | Bit 5 | Bit 6 | Represented meaning |
|---|---|---|---|
| 0 | 0 | 0 | SP allocation (dedicated channel resource allocation information) |
| 1 | 0 | 0 | CBAP allocation (contention channel resource allocation information) |
| 1 | 1 | 1 | Directional channel quality request (directional channel quality measurement request) |
| Another combination | | | Reserved (reserved) |

FIG. 6

CHANNEL RESOURCE SCHEDULING METHOD AND APPARATUS

CROSS-REFERENCE TO RELATED APPLICATIONS

This application is a continuation of International Application No. PCT/CN2016/106715, filed on Nov. 22, 2016, which claims priority to Chinese Patent Application No. 201510982350.7, filed on Dec. 24, 2015. The disclosures of the aforementioned applications are hereby incorporated by reference in their entireties.

TECHNICAL FIELD

Embodiments of the present invention relate to the field of wireless technologies, and in particular, to a channel resource scheduling method and apparatus.

BACKGROUND

IEEE 802.11ad is a technical protocol that provides specifications for a wireless local area network (WLAN) device operating on a 60 GHz frequency band. A network that uses the 802.11ad protocol to perform communication is usually referred to as a gigabit (Directional Multi Gigabit, DMG) network. The DMG network usually includes one access point and a plurality of stations. There is a difference between the 802.11ad protocol and another WLAN protocol. Due to a feature of the 60 GHz frequency band, before communication is performed between the access point and the station or between two stations, generally, beamforming training (BF training) is first performed to find a transmit antenna mode and/or a receive antenna mode that are/is suitable for each other, and then the antenna mode is used to perform communication.

Specifically, optionally, the transmit antenna mode or the receive antenna mode may be a transmit antenna direction or a receive antenna direction. Because an antenna has a plurality of sectors, there are a plurality of transmit antenna directions or receive antenna directions. Due to the transmit antenna direction or the receive antenna direction, a plurality of stations (STAs) that operate at a geographical location of a same frequency band may perform directional transmission in overlapping time domain, and may perform data communication without interference provided that the transmit antenna direction, the receive antenna direction, or both the transmit antenna direction and the receive antenna direction meet a condition. Generally in the field, a technology in which the plurality of STAs that operate at a geographical location of a same frequency band can perform directional transmission in overlapping time domain is referred to as spatial sharing (SPSH).

In the 802.11ad protocol, an SPSH process is divided into two phases. The first phase is spatial sharing assessment (SPSH assessment), that is, determining whether each station pair can perform spatial sharing. The second phase is spatial sharing scheduling (SPSH scheduling). The 802.11ad standard specifies that before spatial sharing assessment is performed, all STAs that need to perform spatial sharing assessment need to complete BF training in advance. A spatial sharing assessment operating process is shown in FIG. 1-a.

1) A PCP/an AP successively sends a directional channel quality request (directional channel quality request) frame to a STA A, a STA B, a STA C, and a STA D that are selected to perform spatial sharing. The STA A communicates with the STA B, and the STA C communicates with the STA D. When the STA receives the channel quality request frame sent by the PCP/AP and agrees to perform directional channel quality measurement, the STA returns a response frame after receiving a short inter-frame space (SIFS) time of the channel quality request frame.

2) The PCP/AP sends an announcement frame only after receiving the response frame sent by all requested STAs. The announcement frame includes information about an SP 1 and an SP 2 that are used for communication and measurement of the STA A, the STA B, the STA C, and the STA D, for example, a start time or duration of a service period (SP), addresses of STAs that perform communication in the SP, and addresses of STAs that perform measurement in the SP. Generally, time domains of the SP 1 and the SP 2 do not overlap, so that one station pair performs communication, and another station pair simultaneously performs measurement. It should be noted that, the STAs that perform communication need to use an antenna mode obtained by previously performing BF training to perform corresponding communication.

3) The STAs that perform communication or measurement each send a directional channel quality report (directional channel quality report) to the PCP/AP after a last SP expires (such as the SP 2 in FIG. 1-a). The directional channel quality report carries interference received signal quality that is measured by the station pair and that is of another station pair when the another station pair performs communication.

4) The PCP/AP determines, based on the directional channel quality report sent by the STA, whether the STAs can perform SPSH. If the STAs can perform SPSH, the PCP/AP adds SPSH SP scheduling information to a next Beacon, that is, implements spatial sharing scheduling for SPSH. For example, the STA A and the STA B, and the STA C and the STA D in FIG. 1-a perform communication in two overlapping SPs.

It can be learned from the above that overheads of an SPSH mechanism in the 802.11ad standard are extremely high, and the channel resource is wasted.

SUMMARY

Embodiments of the present invention provide a channel resource scheduling method and apparatus, so that directional channel quality measurement information can be carried in a management frame to save a channel resource and improve system efficiency.

In at least some embodiments, a channel resource scheduling method, includes sending, by an access point, a management frame, where the management frame includes directional channel quality measurement information, the directional channel quality measurement information includes identifiers of at least two candidate station pairs selected by the access point to perform channel quality measurement and a channel resource that is used for directional channel quality measurement and that is allocated to each candidate station pair in the at least two candidate station pairs, and time domains of channel resources do not overlap;

receiving, by the access point, a directional channel quality measurement report returned by each candidate station in the at least two candidate station pairs, where the directional channel quality measurement report carries received signal quality that is measured by the candidate station and that is of another candidate station pair when the another candidate station pair performs communication by using a corresponding channel resource; and selecting, by the access point based on the directional channel quality measurement report of each candidate station, at least two target station pairs from the at least two candidate station pairs to perform spatial sharing, and indicating time domain overlapping channel resources for spatial sharing to the at least two target station pairs. The directional channel quality measurement information is encapsulated in the management frame, to request a corresponding candidate station pair to perform directional channel quality measurement, so that SPSH mechanism overheads are reduced, a channel resource is saved, and system efficiency is improved.

In at least some embodiments, the management frame includes a beacon frame in a beacon transmission interval BTI or an announcement frame in an announcement transmission interval ATI.

The beacon frame or the announcement frame includes an allocation domain, and the directional channel quality measurement information is encapsulated in the allocation domain. Further, the management frame is limited, the directional channel quality measurement information is encapsulated in the allocation domain of the management frame, and a frame structure length of the allocation domain of the management frame is consistent with a frame structure length of an allocation domain of the existing management frame, so that compatibility with the existing 802.11ad system is implemented.

In at least some embodiments, the allocation domain includes a control domain and an information domain.

The control domain includes identification information, the identification information is used to identify an information category carried in the information domain, and the information category includes a dedicated channel resource allocation information category, a contention channel resource allocation information category, or a directional channel quality measurement information category. Further, an encapsulation information category of the information domain is indicated by using the identification information of the control domain in the allocation domain, so that compatibility with the existing system is implemented.

In at least some embodiments, if the identification information identifies the information category carried in the information domain as the directional channel quality measurement information category, the information domain includes a channel identifier field, a station identifier field, and a channel time domain information field;

an operating frequency of the channel resource that is used for directional channel quality measurement is encapsulated in the channel identifier field;

an identifier of each candidate station pair in the at least one candidate station pair is encapsulated in the station identifier field, and the identifier of the candidate station pair includes an identifier of one or two candidate stations in the candidate station pair; and a start time and duration of first channel resource time domain in at least two channel resources used for directional channel quality measurement are encapsulated in the channel time domain information field. A field including the directional channel quality measurement information is redefined in the allocation domain, to instruct each candidate station in the candidate station pair to perform corresponding communication or measurement, so that overheads are reduced, the channel resource is saved, and compatibility with the existing system is implemented.

In at least some embodiments, a quantity of target station pairs is less than or equal to a quantity of candidate station pairs. The quantity of selected target station pairs is less than or equal to the quantity of candidate station pairs. In this way, a plurality of optional implementations may be implemented, spatial sharing can be performed on a plurality of target station pairs to a greatest extent, and communication quality is ensured.

In at least some embodiments a channel resource scheduling apparatus includes a radio frequency circuit, configured to send a management frame, where the management frame includes directional channel quality measurement information, the directional channel quality measurement information includes identifiers of at least two candidate station pairs selected by the access point to perform channel quality measurement and a channel resource that is used for directional channel quality measurement and that is allocated to each candidate station pair in the at least two candidate station pairs, and time domains of channel resources do not overlap; where the radio frequency circuit is further configured to: receive a directional channel quality measurement report returned by each candidate station in the at least two candidate station pairs, where the directional channel quality measurement report carries received signal quality that is measured by the candidate station and that is of another candidate station pair when the another candidate station pair performs communication by using a corresponding channel resource; and a processor, configured to: select, based on the directional channel quality measurement report of each candidate station, at least two target station pairs from the at least two candidate station pairs to perform spatial sharing, and indicate time domain overlapping channel resources for spatial sharing to the at least two target station pairs. The directional channel quality measurement information is encapsulated in the management frame, to request a corresponding candidate station pair to perform directional channel quality measurement, so that SPSH mechanism overheads are reduced, a channel resource is saved, and system efficiency is improved.

In at least some embodiments, the management frame includes a beacon frame in a beacon transmission interval BTI or an announcement frame in an announcement transmission interval ATI.

The beacon frame or the announcement frame includes an allocation domain, and the directional channel quality measurement information is encapsulated in the allocation domain. Further, the management frame is limited, the directional channel quality measurement information is encapsulated in the allocation domain of the management frame, and a frame structure length of the allocation domain of the management frame is consistent with a frame structure length of an allocation domain of the existing management frame, so that compatibility with the existing 802.11ad system is implemented.

In at least some embodiments, the allocation domain includes a control domain and an information domain.

The control domain includes identification information, the identification information is used to identify an information category carried in the information domain, and the information category includes a dedicated channel resource allocation information category, a contention channel resource allocation information category, or a directional channel quality measurement information category. Further, an encapsulation information category of the information domain is indicated by using the identification information of the control domain in the allocation domain, so that compatibility with the existing system is implemented.

In at least some embodiments, if the identification information identifies the information category carried in the information domain as the directional channel quality measurement information category, the information domain includes a channel identifier field, a station identifier field, and a channel time domain information field;

an operating frequency of the channel resource that is used for directional channel quality measurement is encapsulated in the channel identifier field;

an identifier of each candidate station pair in the at least one candidate station pair is encapsulated in the station identifier field, and the identifier of the candidate station pair includes an identifier of one or two candidate stations in the candidate station pair; and a start time and duration of first channel resource time domain in at least two channel resources used for directional channel quality measurement are encapsulated in the channel time domain information field. A field including the directional channel quality measurement information is redefined in the allocation domain, to instruct each candidate station in the candidate station pair to perform corresponding communication or measurement, so that overheads are reduced, the channel resource is saved, and compatibility with the existing system is implemented.

In at least some embodiments, a quantity of target station pairs is less than or equal to a quantity of candidate station pairs. The quantity of selected target station pairs is less than or equal to the quantity of candidate station pairs. In this way, a plurality of optional implementations may be implemented, spatial sharing can be performed on a plurality of target station pairs to a greatest extent, and communication quality is ensured.

In at least some embodiments of the present invention, the access point sends the management frame. The management frame includes the directional channel quality measurement information. The directional channel measurement information includes the identifiers of the at least two candidate station pairs selected by the access point to perform channel quality measurement and the channel resource that is used for directional channel quality measurement and that is allocated to each candidate station pair in the at least two candidate station pairs. The directional channel quality measurement information is encapsulated in the management frame, to request a corresponding candidate station pair to perform directional channel quality measurement, so that SPSH mechanism overheads are reduced, a channel resource is saved, and system efficiency is improved.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-*a* is a schematic flowchart of SPSH in the prior art according to an embodiment of the present invention;

FIG. 1-*b* is a schematic system diagram of a WLAN deployment scenario according to an embodiment of the present invention;

FIG. 4 is a schematic structural diagram of a beacon frame according to an embodiment of the present invention;

FIG. 5 is a schematic diagram of an allocation control domain frame structure according to an embodiment of the present invention;

FIG. 6 is a table illustrating a correspondence between an allocation type and an information category according to an embodiment of the present invention;

DESCRIPTION OF EMBODIMENTS

Figure 2:
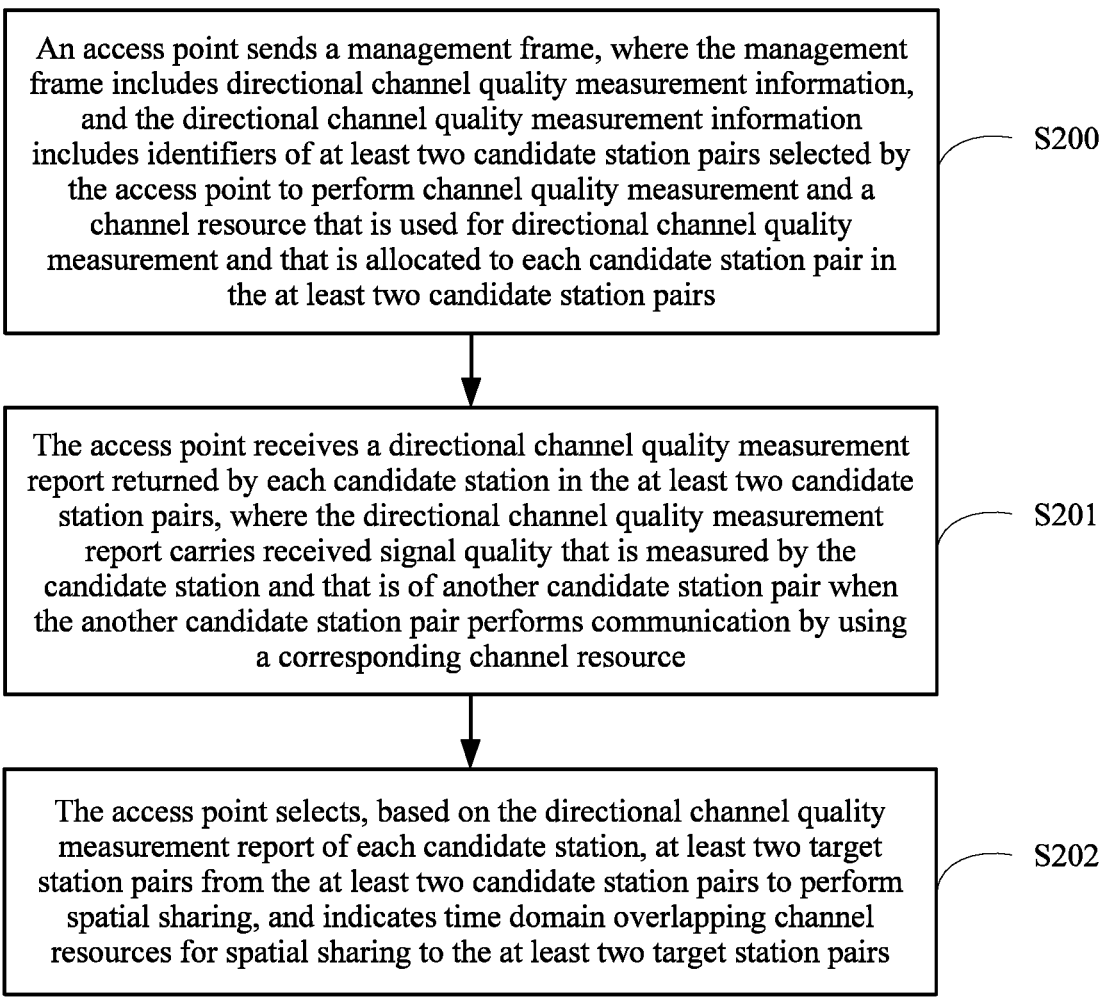
FIG. 2 is a schematic flowchart of a channel resource scheduling method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of embodiments of the present invention.

Embodiments of the present invention may be applied to a WLAN. Currently, IEEE 802.11 series standards are used by the WLAN. The WLAN may include a plurality of basic service sets (BSSs). A network node in the basic service set is a station. The station includes an access point station (AP) and a non-access point station (Non-AP STA). In the embodiments of the present invention, non-AP STAs are collectively referred to as STAs.

Each basic service set may include an access point station and a plurality of STAs associated with the access point station. The access point station may be a personal basic service set (BSS) control point (personal basic service set (PBSS) control point, PCP) or an access point (AP). The PCP coordinates another terminal station in a PBSS to access a wireless medium. The AP provides an access service for the terminal station in the WLAN, and manages and coordinates the terminal station, and the like. All PCPs and APs in the embodiments of the present invention are collectively referred to as access points.

FIG. 1-*b* is a schematic system diagram of a typical WLAN deployment scenario, including one access point and four STAs. The access point separately communicates with a STA 1, a STA 2, a STA 3, and a STA 4. Further, the STAs may communicate with each other. The access point may be a device supporting an 802.11ax standard. Specifically, optionally, the access point is a device supporting an 802.11ad standard or an 802.11ay standard. Further, optionally, the access point may be a device supporting a plurality of WLAN standards such as 802.11ac, 802.11n, 802.11g, 802.11b, and 802.11a.

The station STA may support the 802.11ax standard. Specifically, optionally, the station STA is a device supporting the 802.11ad standard or the 802.11ay standard. Further, optionally, the station supports a plurality of WLAN standards such as 802.11ac, 802.11n, 802.11g, 802.11b, and 802.11a.

When STAs communicate with each other, or the access point PCP/AP communicates with the STA, a STA that initiates communication needs to request the PCP/AP to allocate a channel resource. For example, when the STA 1 needs to communicate with the STA 2, the STA 1 needs to request the PCP/AP to allocate a channel resource used for communication. The channel resource may be a time-frequency resource.

The access point may allocate the channel resource to the STA in the following manners: 1. The PCP/AP allocates an exclusive channel resource SP to a pair of STAs or the PCP/AP and a STA; 2. The PCP/AP allocates a contention-based accessed channel resource.

In the 802.11ad standard, before communication is performed between the PCP/AP and a DMG STA or between two DMG STAs, generally, BF training is first performed to find a transmit antenna mode and/or a receive antenna mode that are/is suitable for each other, and then, the antenna mode is used to perform communication on the channel resource allocated by the PCP/AP. The antenna mode may include an antenna direction. Because each antenna has a plurality of sectors, there may be a plurality of antenna directions. A plurality of STAs that are geographically neighboring may simultaneously perform transmission communication by using different antenna modes in a same SP allocated by the PCP/AP, so that system throughout is increased, and interference is reduced, that is, SPSH is performed.

An SPSH process is divided into two phases. The first phase is spatial sharing assessment, that is, the PCP/AP determines whether each station pair can perform SPSH. The second phase is spatial sharing scheduling, that is, if each station pair can perform SPSH, a beacon frame is sent to instruct each station pair to perform communication in an allocated SP with overlapping time domains. It is specified in the 802.11ad standard that, before spatial sharing assessment is performed, all STAs that need to perform spatial sharing assessment need to complete BF training in advance, so that communication/measurement may be conveniently performed by using this antenna mode when spatial sharing assessment is subsequently performed.

A channel resource scheduling method in the embodiments of the present invention is an improvement on a spatial sharing assessment process. Directional channel quality measurement information is encapsulated in a management frame that is currently sent, to schedule a corresponding station to perform channel quality measurement to determine whether each station pair can perform SPSH, so that a channel resource is saved, and system efficiency is improved.

Referring to FIG. 2, FIG. 2 is a flowchart of a channel resource scheduling method 20 according to an embodiment of the present invention. The method 20 may be applied to an access point, for example, the access point in FIG. 1-b. The access point may support a next-generation WLAN standard, for example, an 802.11ad standard. FIG. 2 is the flowchart of the channel resource scheduling method, and specific operations are as follows:

S200. An access point sends a management frame, where the management frame includes directional channel quality measurement information, the directional channel quality measurement information includes identifiers of at least two candidate station pairs selected by the access point to perform channel quality measurement and a channel resource that is used for directional channel quality measurement and that is allocated to each candidate station pair in the at least two candidate station pairs, and time domains of channel resources do not overlap.

In this embodiment of the present invention, when each station needs to perform communication, the station needs to request a PCP/an AP to allocate a channel resource. It should be noted that, before the station requests the PCP/AP to allocate the channel resource, the station and a corresponding station with which the station communicates need to perform BF training, so as to find a transmit antenna mode and/or a receive antenna mode that are/is suitable for communication between each other.

Specifically, optionally, in a phase of A-BFT, an announcement transmission interval (ATI), or a data transmission interval (DTI) of a beacon interval (BI), a STA A, a STA B, a STA C, and a STA D initiate a channel resource allocation service period (SP) request to the PCP/AP. It should be noted that, the SP request carries the transmit antenna mode and/or the receive antenna mode obtained when the STAs perform beamforming training. It is assumed that the STA A communicates with the STA B, and the STA C communicates with the STA D.

The PCP/AP processes the SP request after receiving the SP request, and performs preliminary estimation based on a transmit antenna mode and/or a receive antenna mode of each STA, so as to determine whether each STA pair that performs communication can perform SPSH. When the PCP/AP preliminarily considers that the STA A, the STA B, the STA C, and the STA D can perform SPSH to increase a system throughout, the PCP/AP may encapsulate the directional channel quality measurement information in a next management frame sent in a BI.

Optionally, the directional channel quality measurement information includes the identifiers of the at least two candidate station pairs that are selected by the PCP/AP to perform channel quality measurement and the channel resource SP that is used for directional channel quality measurement and that is allocated to each candidate station pair in the at least two candidate station pairs, and time domains of SPs do not overlap. It should be noted that, the SP that is used for directional channel quality measurement and that is allocated to each candidate station pair is used by the candidate station pair to perform communication, and each candidate station in another candidate station pair measures interference signal received quality when the candidate station pair performs communication.

In this embodiment of the present invention, information that is used to instruct each candidate station pair to perform directional channel quality measurement is encapsulated in the existing management frame, so that there is no need to separately send a directional channel quality measurement request frame to each candidate station in each candidate station pair, and there is no need to receive a response frame of each candidate station by using the channel resource either. Therefore, the channel resource is saved.

Optionally, the management frame may be a beacon frame in a BTI, or the management frame may be an announcement frame (Announce frame) in an ATI. Each candidate station pair in the STA A, the STA B, the STA C, and the STA D is scheduled by using the management frame to perform mutual communication/measurement. It should be noted that, when one candidate station pair performs communication in a corresponding SP, another candidate station pair measures received signal quality. The signal quality is interference signal quality.

Figure 3:
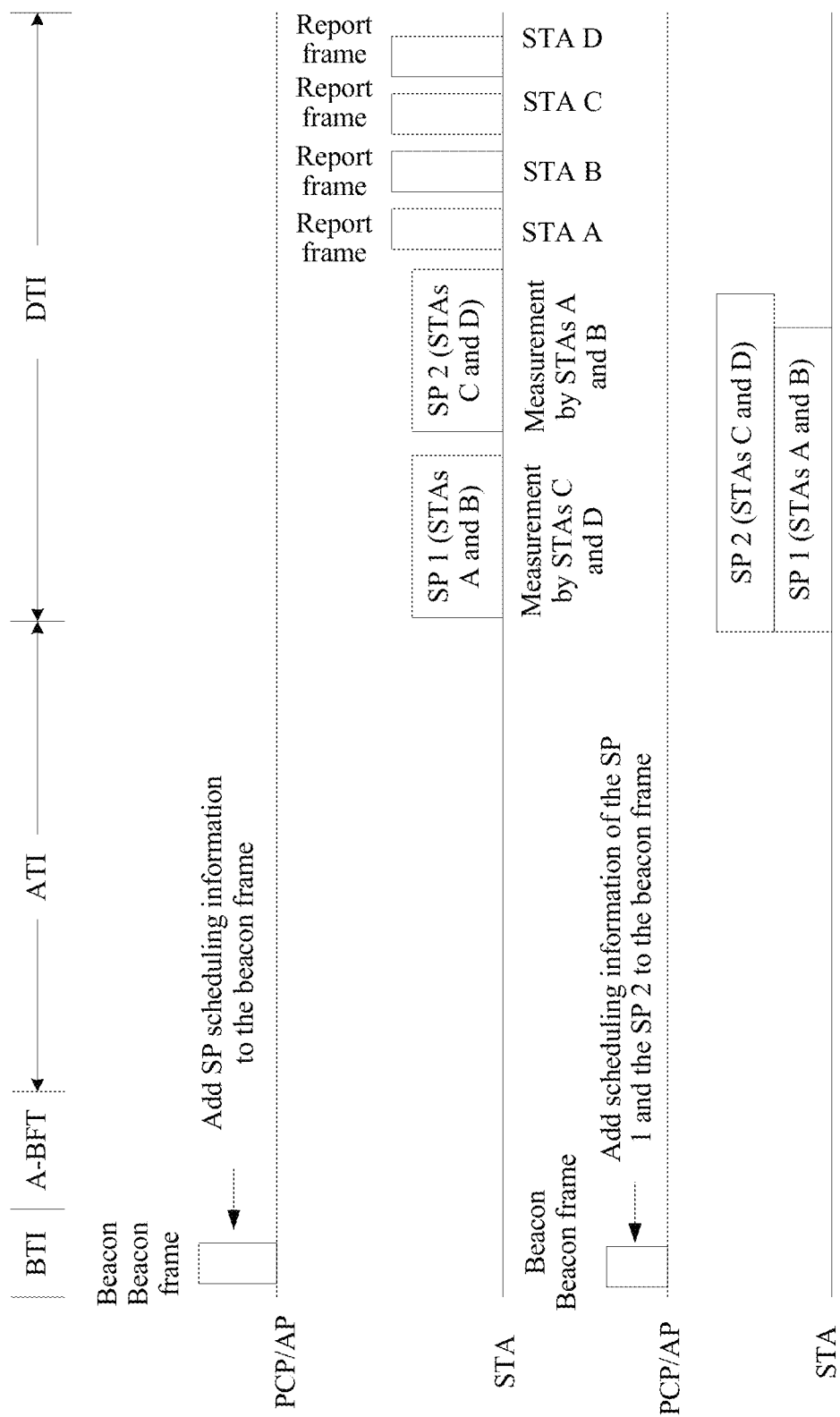
FIG. 3 is a schematic diagram of an SPSH process according to an embodiment of the present invention.

As shown in FIG. 3, FIG. 3 is a flowchart of encapsulating directional channel quality measurement information by using a beacon frame according to an embodiment of the present invention. As shown in FIG. 3, if a STA A, a STA B, a STA C, and a STA D agree to perform SPSH, in a DTI phase, a candidate station pair including the STA A and the STA B performs communication in an SP 1, and the STA C and STA D simultaneously perform measurement, that is, measuring interference signal quality when the STA A and the STA B perform communication. A candidate station pair including the STA C and the STA D performs communication in an SP 2, and the STA A and the STA B simultaneously perform measurement, that is, measuring interference signal quality when the STA C and the STA D perform communication. Optionally, the received interference signal quality may be a received signal-to-noise ratio.

After a last SP (such as the SP 2 in FIG. 3) expires, the STA A, the STA B, the STA C, and the STA D each send a directional channel quality report frame to a PCP/an AP. The report includes the received signal-to-noise ratio measured by the STA A, the STAB, the STA C, and the STA D.

The PCP/AP determines, based on the directional channel quality report sent by each STA, whether each candidate STA pair can perform SPSH. If each candidate STA pair can perform SPSH, the PCP/AP adds SP scheduling information for performing SPSH by the STA A, the STA B, the STA C, and the STA D to a next BTI beacon frame (or a next ATI announcement frame). The STA A and the STA B, and the STA C and the STA D separately perform communication transmission in two time domain overlapping SPs in the DTI. It should be noted that, if the STA A, the STA B, the STA C, and the STA D cannot perform SPSH, the process is terminated.

By comparing the flowchart of FIG. 3 and the flowchart of FIG. 1-a, it can be learned that, transmitting and receiving of a large quantity of frame structures are reduced in FIG. 3, so that a channel resource is saved, and a directional channel quality measurement scheduling request can also be implemented.

Optionally, the management frame may be a beacon frame, or may be an announcement frame in an ATI. Both the beacon frame and the announcement frame include an allocation domain. The directional channel quality measurement information is encapsulated in the allocation domain. As shown in FIG. 4, FIG. 4 is a schematic diagram of an allocation domain according to an embodiment of the present invention. It should be noted that, each field in the allocation domain is merely an example, or may be allocated in another manner.

The allocation domain includes a control domain and an information domain, the allocation domain includes identification information, and the identification information is used to identify an information category encapsulated in the information domain. Optionally, the information category includes a dedicated channel resource allocation information category, a contention channel resource allocation information category, or a directional channel quality measurement information category.

As shown in FIG. 4, FIG. 4 is a schematic diagram of a frame structure of an allocation domain according to an embodiment of the present invention. The frame structure shown in FIG. 4 is obtained by modifying a frame format of an allocation domain in an original 802.11ad standard. The control domain may be an allocation control Allocation control domain in FIG. 4. Further, optionally, a definition of the allocation control domain is shown in FIG. 5. Allocation ID, measurement method, PCP active, and LP SC used are consistent with those in the existing frame structure including an allocation domain or the directional channel quality request frame.

Allocation Type after modification is shown in a table in FIG. 5. An Allocation Type field may be identification information. The information category carried in the information domain may be learned by using each bit value of the Allocation Type field.

When the PCP/AP sends the directional channel quality measurement information to a corresponding STA, a value of the allocation type should be set to 111 (the value can be changed provided that the value is different from another existing value). It should be noted that, if the value of the allocation type is 000, the information category carried in the information domain is the dedicated channel resource allocation information; or if the value of the allocation type is 100, the information category carried in the information domain is the contention channel resource allocation information.

Optionally, the information domain of the allocation domain carries the directional channel quality measurement information. The directional channel quality measurement information is used to identify an identifier of a candidate station pair that performs communication/measurement and an SP corresponding to each candidate station pair. As shown in FIG. 4, the information domain includes a STA operating standard operating class, an operating channel number, STA identifiers AID 1 and AID 2, an SP measurement start time measurement start time, SP measurement duration measurement duration, a measurement unit time number of time blocks, and optional subunits optional subelements.

A frequency of the channel resource SP is encapsulated in the operating channel field, and the identifier of the candidate station pair that performs communication/measurement is encapsulated in the AID 1 and the AID 2. It should be noted that, an identifier of one candidate station or identifiers of two candidate stations in a candidate station pair may be encapsulated in each field of the AID 1 and the AID 2. For example, as shown in FIG. 3, if two candidate station pairs: the STA A and the STA B, and the STA C and the STA D are included, an identifier of the STA A, or an identifier of the STA B, or the identifier of the STA A and the identifier of the STA B may be encapsulated in the AID 1.

A start time of a first SP in all SPs used for channel quality measurement is encapsulated in the SP measurement start time field. The first SP is an SP that starts earliest in all the SPs. A length of duration of one SP is encapsulated in the SP measurement duration. It should be noted that, each STA may obtain a time domain resource of each SP by using an SIFS time only if each STA knows the start time of the first SP and the duration of one SP. Optionally, generally, the SIFS time is a fixed value 16 us in a WIFI system. Alternatively, a start time of each another SP may be indicated by the PCP/AP in the beacon frame or the announcement frame.

As shown in FIG. 4, a length of the allocation domain is 15 octets, and is consistent with a frame structure length of an allocation domain in the existing management frame structure; that is, the allocation field is compatible with the existing 802.11ad system. In this embodiment of the present invention, the directional channel quality measurement information is encapsulated in the management frame mainly by defining different encapsulation manners.

S201. The access point receives a directional channel quality measurement report returned by each candidate station in the at least two candidate station pairs, where the directional channel quality measurement report carries received signal quality that is measured by the candidate station and that is of another candidate station pair when the another candidate station pair performs communication by using a corresponding channel resource.

In this embodiment of the present invention, when all candidate station pairs complete communication/measurement in corresponding SPs, that is, after the last SP expires, each candidate station returns a directional channel quality report frame to the PCP/AP. The report frame carries the received signal quality that is measured by the candidate station and that is of another candidate station pair when the another candidate station pair performs communication by using a corresponding channel resource.

As shown in FIG. 3, after the last SP (that is, the SP 2 in FIG. 3) expires, the STA A, the STA B, the STA C, and the STA D each send a directional channel quality report frame to the PCP/AP. The report frame includes a received signal-to-noise ratio of the STA A, the STA B, the STA C, or the STA D in a corresponding measurement SP. For example, a report frame of the STA A carries a received signal-to-noise ratio when the STA C and the STA D perform communication.

Figure 7:
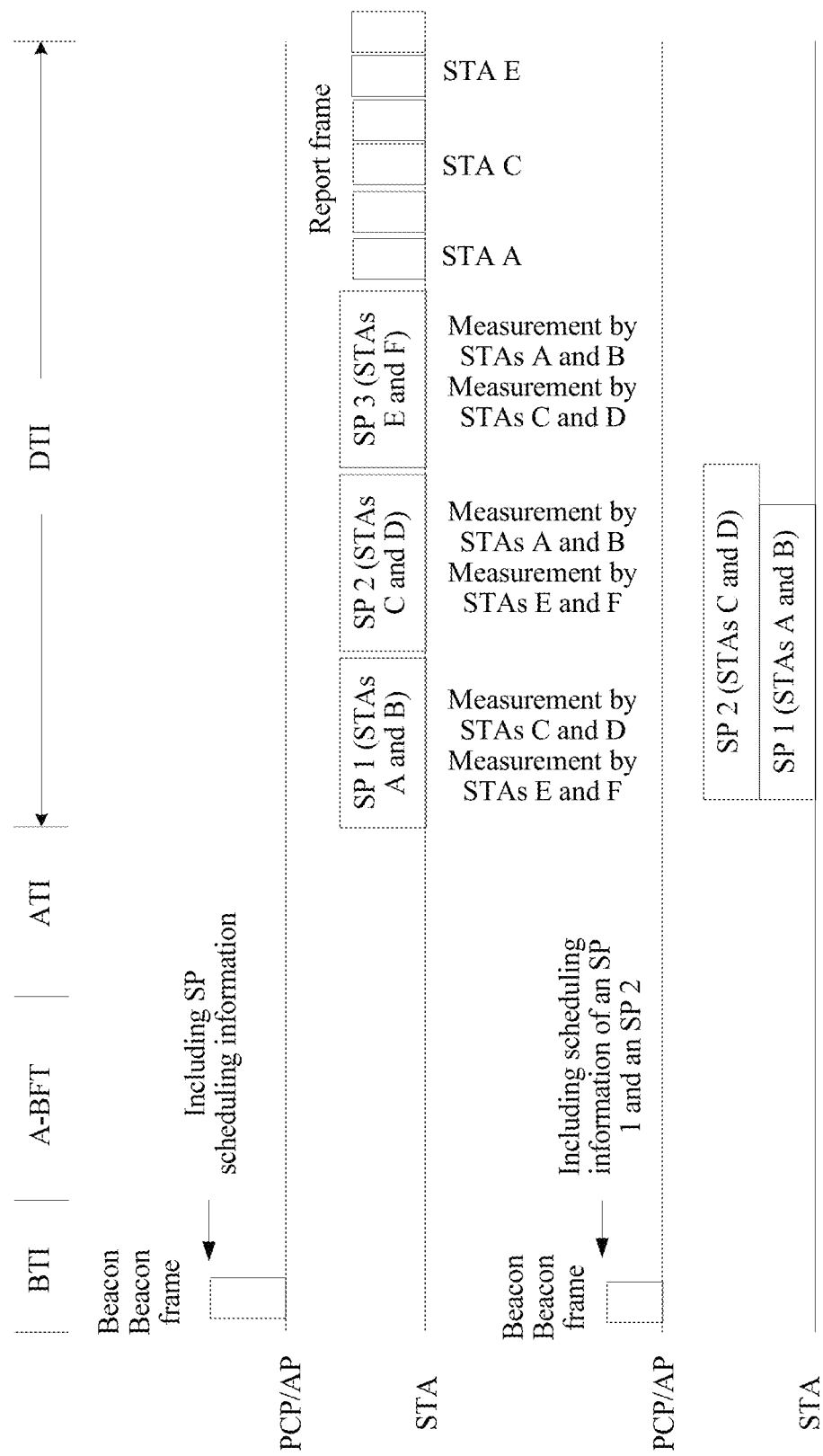
FIG. 7 is a schematic diagram of another SPSH process according to an embodiment of the present invention.

Further, optionally, if there are three or more candidate station pairs, the report frame of each candidate station carries received signal-to-noise ratios when at least two other candidate station pairs perform communication. As shown in FIG. 7, a STA A and a STA B perform communication, a STA C and a STA D perform communication, and a STA E and a STA F perform communication. In a DTI, the STA A and the STA B perform communication in an SP 1, and the STA C and the STA D, and the STA E and the STA F simultaneously perform measurement. The STA C and the STA D perform communication, and the STA A and the STA B, and the STA E and the STA F simultaneously perform measurement. The STA E and the STA F perform communication in an SP 3, and the STA A, the STA B, the STA C, and the STA D simultaneously perform measurement. When the STA A, the STA B, the STA C, the STA D, the STA E, and the STA F each return a report frame, each report frame includes measurement results corresponding to two candidate station pairs. For example, a report frame of the STA A includes a received signal-to-noise ratio when the STA C and the STA D perform communication, and further includes a received signal-to-noise ratio when the STA E and the STA F perform communication.

S202. The access point selects, based on the directional channel quality measurement report of each candidate station, at least two target station pairs from the at least two candidate station pairs to perform spatial sharing, and indicates time domain overlapping channel resources for spatial sharing to the at least two target station pairs.

In this embodiment of the present invention, the PCP/AP determines, based on the directional channel quality measurement report sent by the STA, whether each candidate station pair can perform SPSH. Specifically, optionally, the PCP/AP selects, based on the directional channel quality measurement report of each candidate station, the at least two target station pairs from the at least two candidate station pairs to perform spatial sharing, and indicates the channel resource for spatial sharing to the target station pair.

As shown in FIG. 3, if the PCP/AP determines, through analysis, that the target station pairs: the STA A and the STA B, and the STA C and the STA D can perform SPSH, the PCP/AP adds SP scheduling information for performing SPSH by the STA A and the STA B, and the STA C and the STA D to a next BTI beacon frame (or an ATI announcement frame). The SP is a time domain overlapping channel resource. The STA A and the STA B, and the STA C and the STA D separately perform communication transmission in two overlapping SPs indicated in the DTI. If the STA A and the STA B, and the STA C and the STA D cannot perform SPSH, the process is terminated.

Optionally, a quantity of target station pairs is less than or equal to a quantity of candidate station pairs. As shown in FIG. 7, the PCP/AP determines, based on the directional channel quality measurement report sent by the STA, whether each candidate STA pair can perform SPSH. It is assumed that the PCP/AP determines, through analysis, that the STA A and the STA B, and the STA C and the STA D can perform SPSH in this embodiment. The STA E and the STA F cannot perform SPSH, the STA A and the STA B, and the STA C and the STA D separately perform communication transmission in two overlapping SPs in the DTI to implement SPSH. It should be noted that, if none of the STA A and the STA B, the STA C and the STA D, and the STA E and the STA F can perform SPSH, the process is terminated. In this embodiment, the quantity of selected target station pairs is less than the quantity of candidate station pairs.

Figure 8:
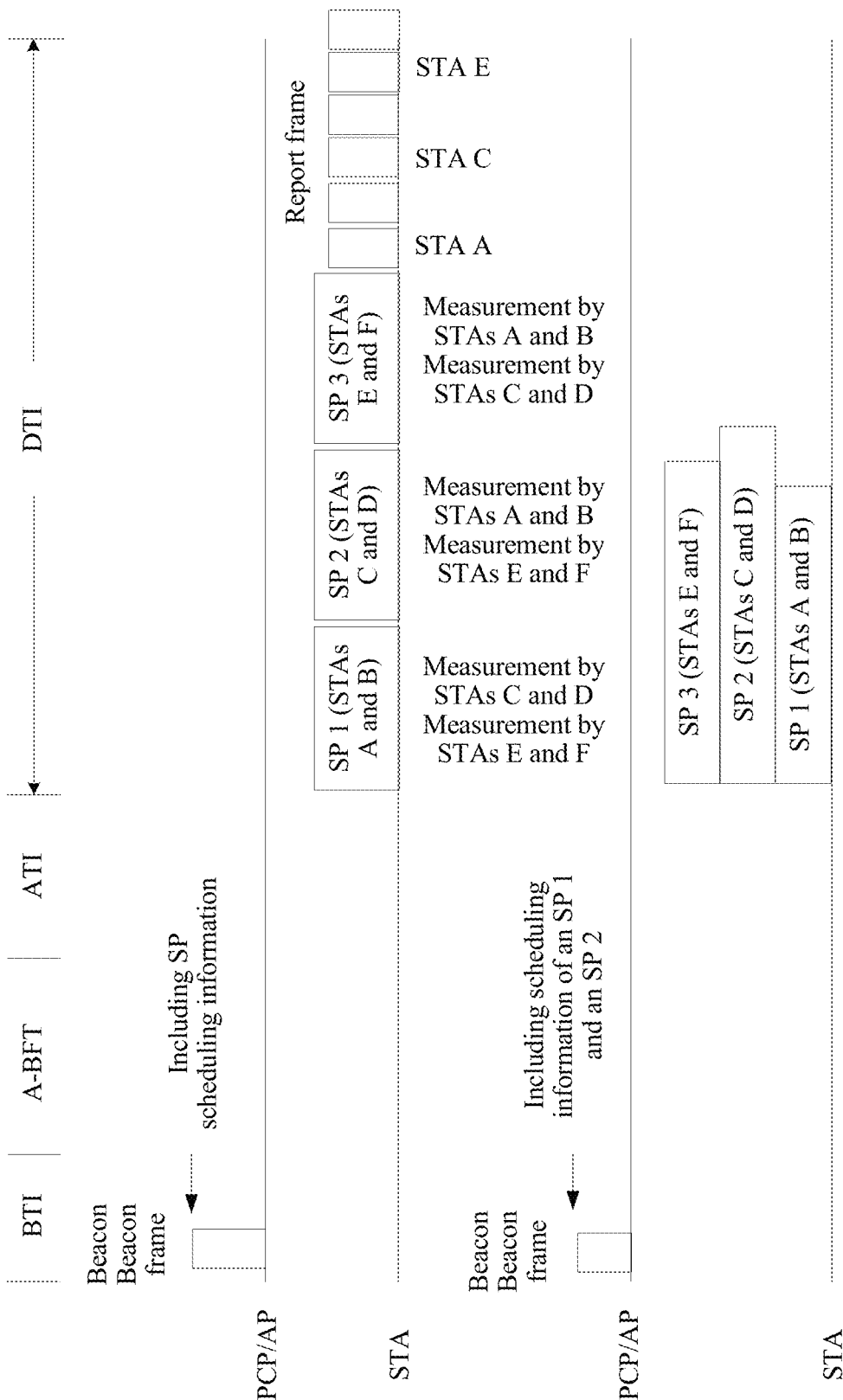
FIG. 8 is a schematic diagram of another SPSH process according to an embodiment of the present invention.

Optionally, as shown in FIG. 8, FIG. 8 shows another case of this embodiment of the present invention. In this embodiment, if a STA A and a STA B, a STA C and a STA D, and a STA E and a STA F can perform SPSH without interfering with each other, the STA A and the STA B, the STA C and the STA D, and the STA E and the STA F perform communication transmission in three overlapping SPs in a DTI to implement SPSH. In this embodiment, the quantity of selected target station pairs is equal to the quantity of candidate station pairs.

In this embodiment of the present invention, the access point sends the management frame. The management frame includes the directional channel quality measurement information. The directional channel measurement information includes the identifiers of the at least two candidate station pairs selected by the access point to perform channel quality measurement and the channel resource that is used for directional channel quality measurement and that is allocated to each candidate station pair in the at least two candidate station pairs. The directional channel quality measurement information is encapsulated in the management frame, to request a corresponding candidate station pair to perform directional channel quality measurement, so that SPSH mechanism overheads are reduced, a channel resource is saved, and system efficiency is improved.

Figure 9:
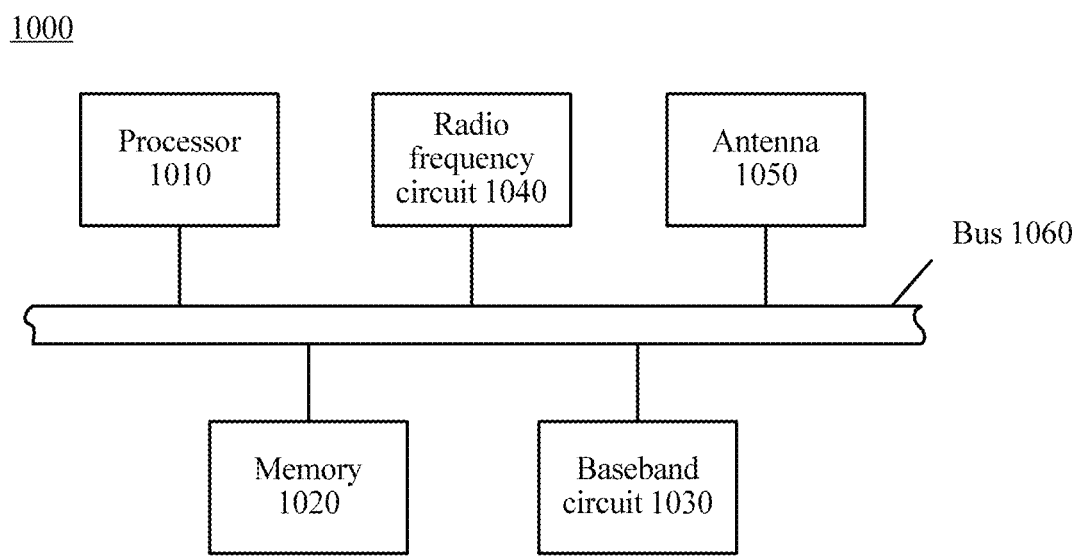
FIG. 9 is a schematic structural diagram of a channel resource scheduling apparatus according to an embodiment of the present invention.

Referring to FIG. 9, FIG. 9 is a schematic block diagram of a channel resource scheduling apparatus according to an embodiment of the present invention. The channel resource scheduling apparatus is, for example, an access point, or a dedicated circuit or a chip implementing a related function. The access point 1000 includes a processor 1010, a memory 1020, a baseband circuit 1030, a radio frequency circuit 1040, and an antenna 1050. The channel resource scheduling apparatus may be the access point shown in FIG. 1-*b*. The access point communicates with the STA 1, the STA 2, the STA 3, and the STA 4. Further, STAs may communicate with each other by using a channel resource allocated by the access point. For example, the STA 1 may communicate with the STA 2, and the STA 3 may communicate with the STA 4, that is, each station pair performs communication. It should be noted that, if a transmit/receive antenna mode of each station pair meets a specific condition, communication of station pairs may be simultaneously performed in one SP, that is, SPSH is performed, so that a system throughout may be increased, and interference is reduced.

Specifically, the processor 1010 controls operations of the access point 1000. The memory 1020 may include a read-only memory and a random access memory, and provide an instruction and data for the processor 1010. The processor may be a general-purpose processor, a digital signal processor, an application-specific integrated circuit, a field programmable gate array, or another programmable logic device. A part of the memory 1020 may further include a nonvolatile random access memory (NVRAM). The baseband circuit 1030 is configured to synthesize to-be-transmitted baseband signals, or decode received baseband signals. The radio frequency circuit 1040 is configured to modulate a low-frequency baseband signal to a high-frequency carrier signal, and the high-frequency carrier signal is transmitted by using the antenna 1050. The radio frequency circuit is also configured to demodulate a high-frequency signal received by the antenna 1050 to a low-frequency carrier signal. The components of the station 1000 are coupled together by using a bus 1060. In addition to a data bus, the bus system 1060 includes a power bus, a control bus, and a status signal bus. However, for clear description, various types of buses in the figure are marked as the bus system 1060. It should be noted that the foregoing descriptions of the access point structure may be applied to subsequent embodiments.

The radio frequency circuit 1040 is configured to send a management frame. The management frame includes directional channel quality measurement information, the directional channel quality measurement information includes identifiers of at least two candidate station pairs selected by the access point to perform channel quality measurement and a channel resource that is used for directional channel quality measurement and that is allocated to each candidate station pair in the at least two candidate station pairs, and time domains of channel resources do not overlap.

Optionally, information that is used to instruct each candidate station pair to perform directional channel quality measurement is encapsulated in the existing management frame, so that there is no need to separately send a directional channel quality measurement request frame to each candidate station in each candidate station pair, and there is no need to receive a response frame of each candidate station by using the channel resource either. Therefore, the channel resource is saved.

Optionally, the management frame may be a beacon frame in a BTI, or the management frame may be an announcement frame (Announce frame) in an ATI. Each candidate station pair is scheduled by using the management frame to perform mutual communication/measurement.

It should be noted that, when one candidate station pair performs communication in a corresponding SP, another candidate station pair measures received signal quality. The signal quality is interference signal quality.

The radio frequency circuit 1040 is further configured to: receive a directional channel quality measurement report returned by each candidate station in the at least two candidate station pairs. The directional channel quality measurement report carries received signal quality that is measured by the candidate station and that is of another candidate station pair when the another candidate station pair performs communication by using a corresponding channel resource.

Optionally, when all candidate station pairs complete communication/measurement in corresponding SPs, that is, after a last SP expires, each candidate station returns a directional channel quality report frame to the PCP/AP. The report frame carries the received signal quality that is measured by the candidate station and that is of another candidate station pair when the another candidate station pair performs communication by using a corresponding channel resource.

Further, optionally, if there are three or more candidate station pairs, the report frame of each candidate station carries received signal-to-noise ratios when at least two other candidate station pairs perform communication. As shown in FIG. 7, a STA A and a STA B perform communication, a STA C and a STA D perform communication, and a STA E and a STA F perform communication. In a DTI, the STA A and the STA B perform communication in an SP 1, and the STA C and the STA D, and the STA E and the STA F simultaneously perform measurement. The STA C and the STA D perform communication, and the STA A and the STA B, and the STA E and the STA F simultaneously perform measurement. The STA E and the STA F perform communication in an SP 3, and the STA A and the STA B, and the STA C and the STA D simultaneously perform measurement. When the STA A, the STA B, the STA C, the STA D, the STA E, and the STA F each return a report frame, each report frame includes measurement results corresponding to two candidate station pairs. For example, a report frame of the STA A includes a received signal-to-noise ratio when the STA C and the STA D perform communication, and further includes a received signal-to-noise ratio when the STA E and the STA F perform communication.

The processor 1010 is configured to: select, based on the directional channel quality measurement report of each candidate station, at least two target station pairs from the at least two candidate station pairs to perform spatial sharing, and indicate time domain overlapping channel resources for spatial sharing to the at least two target station pairs.

Optionally, a quantity of target station pairs is less than or equal to a quantity of candidate station pairs. As shown in FIG. 7, the PCP/AP determines, based on the directional channel quality measurement report sent by the STA, whether each candidate STA pair can perform SPSH. It is assumed that the PCP/AP determines, through analysis, that the STA A and the STA B, and the STA C and the STA D can perform SPSH in this embodiment. The STA E and the STA F cannot perform SPSH, the STA A and the STA B, and the STA C and the STA D separately perform communication transmission in two overlapping SPs in the DTI to implement SPSH. It should be noted that, if none of the STA A and the STA B, the STA C and the STA D, and the STA E and the STA F can perform SPSH, the process is terminated. In this embodiment, the quantity of selected target station pairs is less than the quantity of candidate station pairs.

Optionally, as shown in FIG. 8, FIG. 8 shows another case of this embodiment of the present invention. In this embodiment, if a STA A and a STA B, a STA C and a STA D, and a STA E and a STA F can perform SPSH without interfering with each other, the STA A and the STA B, the STA C and the STA D, and the STA E and the STA F perform communication transmission in three overlapping SPs in a DTI to implement SPSH. In this embodiment, the quantity of selected target station pairs is equal to the quantity of candidate station pairs.

Optionally, the management frame includes a beacon frame in a beacon transmission interval BTI or an announcement frame in an announcement transmission interval ATI.

The beacon frame or the announcement frame includes an allocation domain, and the directional channel quality measurement information is encapsulated in the allocation domain.

Further, optionally, the allocation domain includes a control domain and an information domain.

The control domain includes identification information, the identification information is used to identify an information category carried in the information domain, and the information category includes a dedicated channel resource allocation information category, a contention channel resource allocation information category, or a directional channel quality measurement information category.

Optionally, the control domain may be an allocation control allocation control domain in FIG. 4. Further, optionally, a definition of the allocation control domain is shown in FIG. 5. Allocation ID, measurement method, PCP active, and LP SC used are consistent with those in the existing frame structure including an allocation domain or the directional channel quality request frame.

As an optional implementation, if the identification information identifies the information category carried in the information domain as the directional channel quality measurement information category, the information domain includes a channel identifier field, a station identifier field, and a channel time domain information field;

an operating frequency of the channel resource that is used for directional channel quality measurement is encapsulated in the channel identifier field;

an identifier of each candidate station pair in the at least one candidate station pair is encapsulated in the station identifier field, and the identifier of the candidate station pair includes an identifier of one or two candidate stations in the candidate station pair; and a start time and duration of first channel resource time domain in at least two channel resources used for directional channel quality measurement are encapsulated in the channel time domain information field.

Optionally, the information domain of the allocation domain carries the directional channel quality measurement information. The directional channel quality measurement information is used to identify an identifier of a candidate station pair that performs communication/measurement and an SP corresponding to each candidate station pair. As shown in FIG. 4, the information domain includes a STA operating standard operating class, an operating channel number, STA identifiers AID 1 and AID 2, an SP measurement start time measurement start time, SP measurement duration measurement duration, a measurement unit time number of time blocks, and optional subunits optional subelements.

A frequency of the channel resource SP is encapsulated in the operating channel field, and the identifier of the candidate station pair that performs communication/measurement is encapsulated in the AID 1 and the AID 2. It should be noted that, an identifier of one candidate station or identifiers of two candidate stations in a candidate station pair may be encapsulated in each field of the AID 1 and the AID 2. For example, as shown in FIG. 3, if two candidate station pairs: the STA A and the STA B, and the STA C and the STA D are included, an identifier of the STA A, or an identifier of the STA B, or the identifier of the STA A and the identifier of the STA B may be encapsulated in the AID 1.

Optionally, a quantity of target station pairs is less than or equal to a quantity of candidate station pairs.

In the embodiments of the present invention, the access point sends the management frame. The management frame includes the directional channel quality measurement information. The directional channel measurement information includes the identifiers of the at least two candidate station pairs selected by the access point to perform channel quality measurement and the channel resource that is used for directional channel quality measurement and that is allocated to each candidate station pair in the at least two candidate station pairs. The directional channel quality measurement information is encapsulated in the management frame, to request a corresponding candidate station pair to perform directional channel quality measurement, so that SPSH mechanism overheads are reduced, a channel resource is saved, and system efficiency is improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

A sequence of the operations of the method in the embodiments of the present invention may be adjusted, and certain operations may also be merged or removed according to an actual requirement.

The modules or the units in the terminal in the embodiments of the present invention may be combined, divided, and deleted according to an actual requirement.

The component such as the microcontroller in the embodiments of the present invention may be implemented by a universal integrated circuit, such as a central processing unit (CPU), or by an application-specific integrated circuit (ASIC).

What is disclosed above is merely example embodiments of the present invention, and certainly is not intended to limit the protection scope of embodiments of the present invention. Therefore, equivalent variations made in accordance with the claims of embodiments of the present invention shall fall within the scope of the embodiments of present invention.

What is claimed is:

1. A channel resource scheduling method, comprising:
   sending, by an access point, a management frame, wherein the management frame comprises directional channel quality measurement information, the directional channel quality measurement information comprises identifiers of at least two pairs of candidate stations comprising a first pair of the candidate stations and a second pair of the candidate stations selected by the access point to perform channel quality measurement and a channel resource that is used for directional channel quality measurement and that is allocated to each candidate station pair in the at least two pairs of the candidate stations, and time domains of channel resources do not overlap, wherein the identifiers of the at least two pairs of the candidate stations comprise a first identifier of the first pair of candidate stations and a second identifier of the second pair of candidate stations;
   receiving, by the access point, a directional channel quality measurement report returned by each candidate station in the at least two candidate station pairs, wherein the directional channel quality measurement report carries received signal quality that is measured by the candidate station and that is of another candidate station pair when the another candidate station pair performs communication by using a corresponding channel resource; and selecting, by the access point based on the directional channel quality measurement report of each candidate station, at least two target station pairs from the at least two candidate station pairs to perform spatial sharing, and indicating time domain overlapping channel resources for spatial sharing to the at least two target station pairs.

2. The method according to claim 1, wherein the management frame comprises a beacon frame in a beacon transmission interval or an announcement frame in an announcement transmission interval; and wherein the beacon frame or the announcement frame comprises an allocation domain, and the directional channel quality measurement information is encapsulated in the allocation domain.

3. The method according to claim 2, wherein the allocation domain comprises a control domain and an information domain; and the control domain comprises identification information, wherein the identification information is used to identify an information category carried in the information domain, and the information category comprises a dedicated channel resource allocation information category, a contention channel resource allocation information category, or a directional channel quality measurement information category.

4. The method according to claim 3, wherein if the identification information identifies the information category carried in the information domain as the directional channel quality measurement information category, the information domain comprises a channel identifier field, a station identifier field, and a channel time domain information field;

wherein an operating frequency of the channel resource that is used for directional channel quality measurement is encapsulated in the channel identifier field;

wherein the first identifier of the first pair of the candidate stations is encapsulated in the station identifier field, and the first identifier comprises an identifier of one or two candidate stations in the first pair; and wherein a start time and duration of a first channel resource time domain in at least two channel resources used for directional channel quality measurement are encapsulated in the channel time domain information field.

5. The method according to claim 1, wherein a quantity of target station pairs is less than or equal to a quantity of candidate station pairs.

6. A channel resource scheduling apparatus, comprising a processor; and a non-transitory computer readable storage medium storing programming for execution by the processor, the programming, when executed by the processor, instructing the apparatus to:

send a management frame, wherein the management frame comprises directional channel quality measurement information, the directional channel quality measurement information comprises identifiers of at least two pairs of candidate stations comprising a first pair of the candidate stations and a second pair of the candidate stations selected by the access point to perform channel quality measurement and a channel resource that is used for directional channel quality measurement and that is allocated to each candidate station pair in the at least two pairs of the candidate stations, and time domains of channel resources do not overlap, wherein the identifiers of the at least two pairs of the candidate stations comprise a first identifier of the first pair of candidate stations and a second identifier of the second pair of candidate stations; and receive a directional channel quality measurement report returned by each candidate station in the at least two candidate station pairs, wherein the directional channel quality measurement report carries received signal quality that is measured by the candidate station and that is of another candidate station pair when the another candidate station pair performs communication by using a corresponding channel resource; and select, based on the directional channel quality measurement report of each candidate station, at least two target station pairs from the at least two candidate station pairs to perform spatial sharing, and indicate time domain overlapping channel resources for spatial sharing to the at least two target station pairs.

7. The apparatus according to claim 6, wherein the management frame comprises a beacon frame in a beacon transmission interval or an announcement frame in an announcement transmission interval; and wherein the beacon frame or the announcement frame comprises an allocation domain, and the directional channel quality measurement information is encapsulated in the allocation domain.

8. The apparatus according to claim 7, wherein the allocation domain comprises a control domain and an information domain; and the control domain comprises identification information, wherein the identification information is used to identify an information category carried in the information domain, and the information category comprises a dedicated channel resource allocation information category, a contention channel resource allocation information category, or a directional channel quality measurement information category.

9. The apparatus according to claim 8, wherein if the identification information identifies the information category carried in the information domain as the directional channel quality measurement information category, the information domain comprises a channel identifier field, a station identifier field, and a channel time domain information field;

wherein an operating frequency of the channel resource that is used for directional channel quality measurement is encapsulated in the channel identifier field;

wherein the first identifier of the first pair in one of the candidate stations is encapsulated in the station identifier field, and the first identifier comprises an identifier of one or two candidate stations in the first pair; and wherein a start time and duration of first channel resource time domain in at least two channel resources used for directional channel quality measurement are encapsulated in the channel time domain information field.

10. The apparatus according to claim 6, wherein a quantity of target station pairs is less than or equal to a quantity of candidate station pairs.

11. A non-transitory machine-readable medium comprising computer program instructions stored thereon for performing, when executed on a processor of an access point, causes the access point performing operations comprising:

sending, a management frame, wherein the management frame comprises directional channel quality measurement information, the directional channel quality measurement information comprises identifiers of at least two pairs of candidate stations comprising a first pair of the candidate stations and a second pair of the candidate stations selected by the access point to perform channel quality measurement and a channel resource that is used for directional channel quality measurement and that is allocated to each candidate station pair in the at least two pairs of the candidate stations, and time domains of channel resources do not overlap, wherein the identifiers of the at least two pairs of the candidate stations comprise a first identifier of the first pair of candidate stations and a second identifier of the second pair of candidate stations;

receiving, a directional channel quality measurement report returned by each candidate station in the at least two candidate station pairs, wherein the directional channel quality measurement report carries received signal quality that is measured by the candidate station and that is of another candidate station pair when the another candidate station pair performs communication by using a corresponding channel resource; and selecting, based on the directional channel quality measurement report of each candidate station, at least two target station pairs from the at least two candidate station pairs to perform spatial sharing, and indicating time domain overlapping channel resources for spatial sharing to the at least two target station pairs.

12. The non-transitory machine-readable medium according to claim 11, wherein the management frame comprises a beacon frame in a beacon transmission interval or an announcement frame in an announcement transmission interval; and wherein the beacon frame or the announcement frame comprises an allocation domain, and the directional channel quality measurement information is encapsulated in the allocation domain.

13. The non-transitory machine-readable medium according to claim 12, wherein the allocation domain comprises a control domain and an information domain; and the control domain comprises identification information, wherein the identification information is used to identify an information category carried in the information domain, and the information category comprises a dedicated channel resource allocation information category, a contention channel resource allocation information category, or a directional channel quality measurement information category.

14. The non-transitory machine-readable medium according to claim 13, wherein if the identification information identifies the information category carried in the information domain as the directional channel quality measurement information category, the information domain comprises a channel identifier field, a station identifier field, and a channel time domain information field;

wherein an operating frequency of the channel resource that is used for directional channel quality measurement is encapsulated in the channel identifier field;

wherein the first identifier of the first pair of the candidate stations is encapsulated in the station identifier field, and the first identifier comprises an identifier of one or two candidate stations in the first pair; and wherein a start time and duration of a first channel resource time domain in at least two channel resources used for directional channel quality measurement are encapsulated in the channel time domain information field.

15. The non-transitory machine-readable medium according to claim 11, wherein a quantity of target station pairs is less than or equal to a quantity of candidate station pairs.

* * * * *